Figure 1:
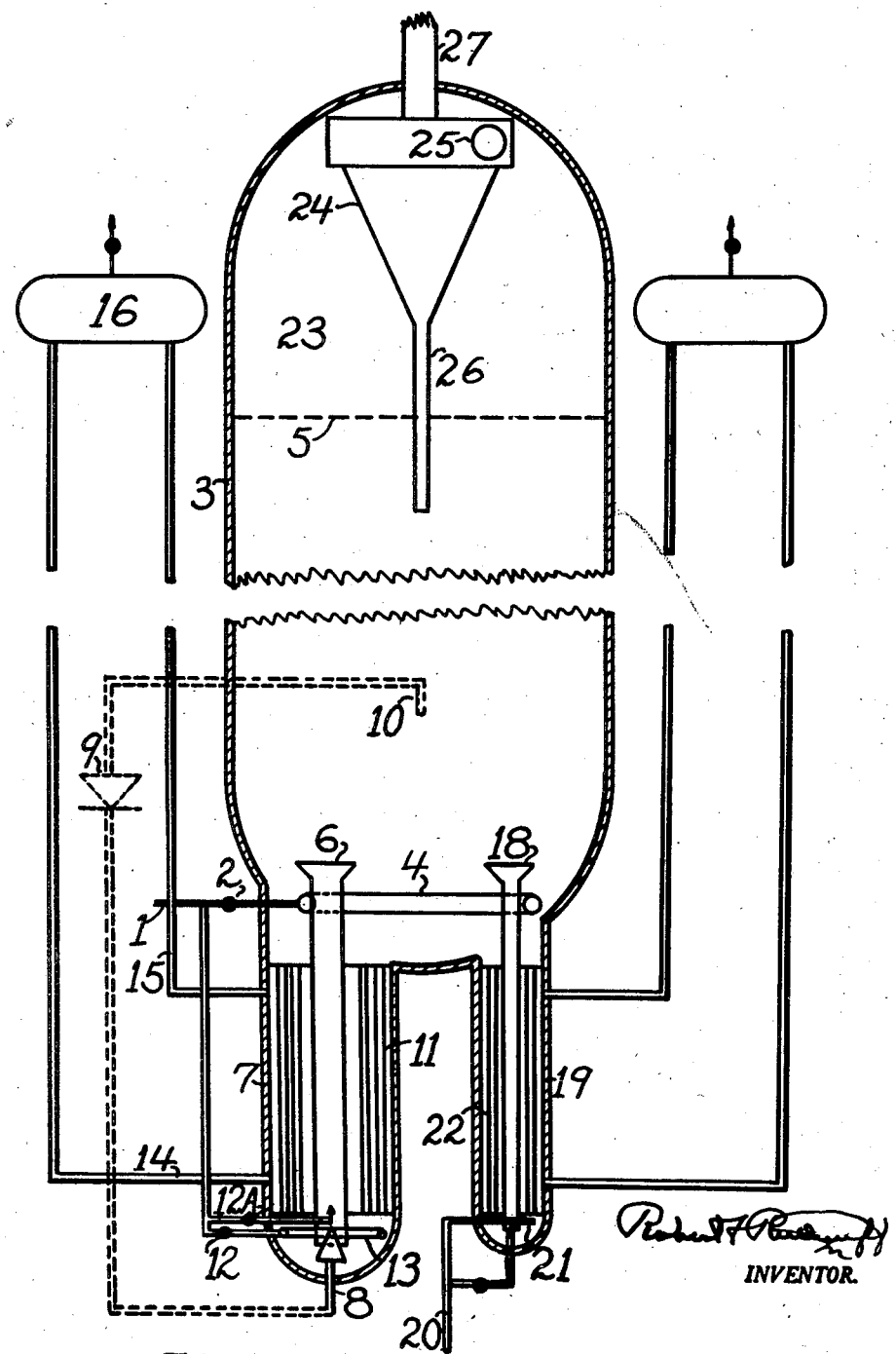

June 19, 1951  R. F. RUTHRUFF  2,557,842
HYDROCARBON SYNTHESIS WITH FLUIDIZED CATALYST
Filed Jan. 8, 1945  2 Sheets-Sheet 2
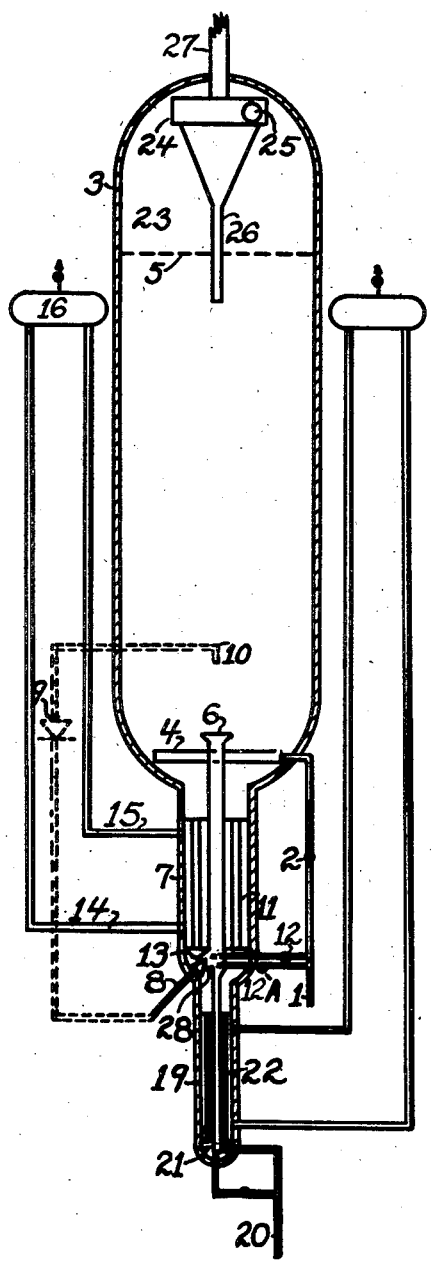
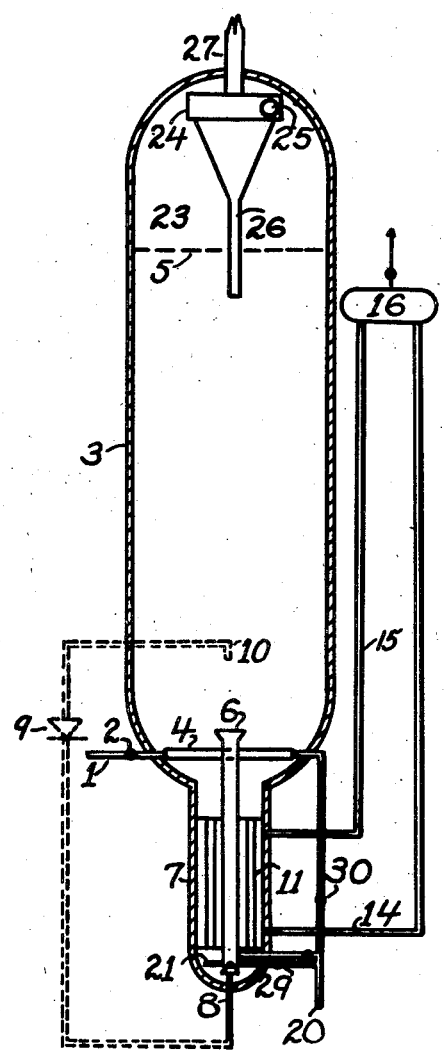
INVENTOR.

Patented June 19, 1951

2,557,842

UNITED STATES PATENT OFFICE 2,557,842

HYDROCARBON SYNTHESIS WITH FLUIDIZED CATALYST

Robert F. Ruthruff, Chicago, Ill.

Application January 8, 1945, Serial No. 571,914

3 Claims. (Cl. 260—449.6)

This invention relates to the synthesis of hydrocarbons by the catalytic reduction of carbon monoxide with hydrogen. More particularly, this invention relates to the maintaining of the catalyst employed in the synthesis of hydrocarbons by the reduction of carbon monoxide with hydrogen in a high state of activity.

The Fischer synthesis for the production of hydrocarbons by the catalytic reduction of carbon monoxide with hydrogen is more or less familiar to those skilled in the art. In this process, a mixture of carbon monoxide and hydrogen is passed over a suitable catalyst at (usually) rather low temperatures and at (usually) atmospheric or low superatmospheric pressures. The carbon monoxide is reduced by the hydrogen with the formation of a mixture of hydrocarbons ranging from methane to extremely high melting point waxes. In my copending application, Serial Number 562,567, filed November 8, 1944, which issued as Patent No. 2,467,407 on April 19, 1949, will be found a brief review of the Fischer process, including discussions of such items as preparation of the carbon monoxide-hydrogen synthesis gas charge, the synthesis catalysts, operating conditions, properties of the products, et cetera.

The present invention is particularly directed to that variation of the Fischer synthesis in which a supported, promoted cobalt catalyst is employed at atmospheric pressure. (In the present description it is to be understood that the term atmospheric pressure is relative only and means a pressure in the range from atmospheric pressure to low superatmospheric pressures. As is familiar to those skilled in the art, operations loosely referred to as atmospheric pressure operations are almost invariably conducted at a pressure of several pounds or even a few atmospheres in order to overcome pressure drop through the apparatus, et cetera.)

In the synthesis of hydrocarbons by the atmospheric pressure reduction of carbon monoxide with hydrogen in the presence of a supported, promoted cobalt catalyst it has been observed that the catalyst gradually declines in activity with time on stream. This decline in activity is usually attributed to the gradual deposition of traces of high melting paraffins on the catalyst surfaces. It has been found that a thus deactivated catalyst can be more or less completely restored by treatment with hydrogen at about the usual synthesis reaction temperature. In this reactivation process, it appears that about half of the wax removed from the catalyst is destroyed by being cracked and eliminated as methane while the remainder is removed by vaporization into the stream of hydrogen.

Illustrative of prior art catalyst reactivation procedures when operating at atmospheric pressure with a stationary catalyst bed the following information is presented:

With a new, supported, promoted cobalt catalyst the synthesis reaction is initiated at a comparatively low synthesis temperature, for example, in the range 355°–375° F. During an on-stream period of from five to six weeks the temperature is gradually increased at the rate necessary to maintain constant conversion until finally a comparatively high synthesis temperature is reached, for example, 392° F. At this time the passage of synthesis gas is stopped and the catalyst is treated with hydrogen at 400° F. for about half a day. After reactivation, temperature is reduced to the previously mentioned comparatively low initial level and passage of synthesis gas is resumed. During this second passage of synthesis gas temperature is increased as before, the previously mentioned comparatively high level being reached in four to five weeks. The second reactivation follows. During the third and final on-stream period constant conversions are maintained both by increasing reaction temperature and by reducing synthesis gas charge rate. For example, the temperature is raised as required from the comparatively low initial level to the comparatively high final value previously mentioned, following which the synthesis gas charge rate is reduced at the rate necessary to maintain conversion constant until the charge rate reaches a value equivalent to 66% of the initial charge rate and then, finally, the reaction temperature is again gradually increased as required to about 400° F. At the conclusion of this third on-stream period the catalyst is removed and replaced by new catalyst.

While, at first sight, the above schedule does not appear to be particularly onerous, further consideration will show that it leaves much to be desired. In the first place, it is necessary to adjust the operating temperature upward frequently. This is not desirable under any circumstances and is especially disadvantageous in the present instance where the reaction is highly exothermic and very temperature sensitive. In the synthesis reaction, absolute temperature control is essential. If the temperature rises even a few degrees above that proper for the synthesis reaction, methane is the sole product and the catalyst is ruined as far as the production of higher hydrocarbons is concerned. Because of the highly exothermic nature of the synthesis reaction, absolute temperature control is difficult to achieve and once achieved it would be highly advantageous if it were possible to maintain conditions constant rather than being forced to make potentially destructive changes at frequent intervals.

Furthermore, in accordance with the above schedule, production in unit time is declining during a considerable portion of the on-stream period, i. e. during the greater part of the third on-stream period. This is disadvantageous from two points of view. In the first place, production is lower than it would be were it possible to maintain synthesis gas charge rate constant throughout the on-stream period. This is obviously disadvantageous. Secondly, during the period of decreasing synthesis gas charge rate, the various elements of the unit (e. g. compressors, catalyst cases, ducts, towers, pumps, heaters, coolers, et cetera) designed for use under one particular rate of synthesis gas charge must be made to operate under a series of synthesis gas charge rates other than the design rate. This also is highly disadvantageous.

Additionally, the catalyst life is not as great (about four months) as could be desired. Cobalt is a relatively expensive element. While the removed catalyst is not discarded, it must be decomposed, the cobalt must be recovered and a new batch of catalyst made therefrom. This is a very expensive process and a longer catalyst life would be of great advantage.

Finally, while the number of reactivations and the time required for each are not excessive, yet if changing from on-stream to reactivation and back again could be avoided some advantage would accrue.

My invention relates to the continuous reactivation of Fischer synthesis catalysts by means of hydrogen. By the practice of my invention the disadvantages of prior art procedures may be largely or entirely eliminated. By the practice of my invention the operating temperature remains constant throughout the entire life cycle of a charge of catalyst. By the practice of my invention, the synthesis gas charge rate remains constant throughout the entire life cycle of a charge of catalyst. By the practice of my invention, product production in unit time remains constant throughout the entire life cycle of a charge of catalyst. By the practice of my invention the on-stream period is not interrupted for reactivation throughout the entire life cycle of a charge of catalyst. Finally, by the practice of my invention, the life cycle of a charge of catalyst is greater than under prior art procedures, the exact increase in catalyst life to be achieved being, as yet, unknown.

A complete understanding of my invention may be obtained from the following detailed description thereof, read in conjunction with the accompanying figures wherein Figure 1 is a diagrammatic illustration in section of one form of reactor suitable for the purposes of the instant invention, and Figure 2 is a diagrammatic illustration in section of a modified form of reactor suitable for the purposes of the instant invention, and Figure 3 is a diagrammatic illustration in section of yet another modified form of reactor suitable for the purposes of the instant invention.

Turning now to a more detailed description of Figure 1, synthesis gas enters the system through duct 1. This synthesis gas may be prepared by any method known to the art. For example, synthesis gas may be prepared from solid carbonaceous fuels (exemplified in the equations by carbon) through the water gas reaction:

$$C+H_2O=CO+H_2$$

Since, preferably the synthesis gas contains carbon monoxide and hydrogen in a ratio of about 1:2, a portion of the product from the above orthodox water gas reaction is preferably reacted further with water (steam) to form additional hydrogen:

$$CO+H_2O=CO_2+H_2$$

The overall reaction is:

$$3C+4H_2O=2CO+4H_2+CO_2$$

Carbon monoxide and hydrogen are present in the resulting gas mixture in the usually desired 1:2 ratio. Carbon dioxide is either separated from the gas mixture before use or the total gas mixture may be charged to the synthesis reactor wherein the carbon dioxide acts as an inert diluent.

It may be mentioned at this point that in the present invention, wherein the synthesis catalyst is continuously reactivated with hydrogen, the hydrogen that is not destroyed in the reactivation step intermixes with the synthesis gas in the synthesis reactor and thus aids in bringing a synthesis gas deficient in hydrogen up towards or to the desired 1:2 ratio.

Also, the desired synthesis gas mixture may be prepared from gaseous hydrocarbons (exemplified in the equations by methane) by several procedures, for example:

$$CH_4+1/2O_2=CO+2H_2$$

and $$3CH_4+2H_2O+CO_2=4CO+8H_2$$

In the first reaction it is preferable to use fairly pure oxygen to avoid excessive dilution of the product gas with nitrogen. These reactions may be carried out in an externally heated tube or in regenerative furnaces. A catalyst is preferably used, for example, supported nickel, promoted or not, as desired, with e. g. thoria or ceria. However, catalysts are only necessary when operating at intermediate temperatures; at high temperatures catalysts are not required.

A portion of the synthesis gas passes through valve 2 to reactor 3. Preferably, the portion of the synthesis gas passing through valve 2 is introduced into reactor 3 through a distributor such as a ring or a spider 4 to aid in the distribution of the gas rather uniformly over the cross section of reactor 3.

Reactor 3 contains a supported, promoted cobalt catalyst in finely divided form. As the result of passage of the synthesis gas upward through this finely divided catalyst at a superficial linear velocity of about 1 to 3 feet per second, for example, 1.5 to 2 feet per second, the finely divided catalyst assumes the fluidized form, the upper level of the fluidized bed being indicated by 5.

Fluidized catalyst flows downward through standpipe 6 within catalyst cooler 7, the rate of flow of catalyst downward through standpipe 6 being controlled by the setting of valve 8. The setting of valve 8 may be automatically regulated by flow controller 9 which is in turn responsive to the temperature within the catalyst bed as measured by thermocouple 10. Catalyst flowing to the bottom of catalyst cooler 7 through standpipe 6 is moved upward through the tubes 11 of catalyst cooler 7 by means of another portion of the synthesis gas introduced into the bottom of catalyst cooler 7 through valve 12 and distributor ring or spider 13. Preferably, provision should be made for introducing a small flow of synthesis gas, regulated by valve 12A directly into standpipe 6 to keep the catalyst therein aerated. Obviously, a higher catalyst density is maintained in standpipe 6 than in tubes 11 to insure catalyst flow as previously described.

The tubes 11 of catalyst cooler 7 are surrounded by water introduced and removed through lines 14 and 15. This water is preferably at an elevated pressure and the temperature corresponding thereto. Heat absorbed from the catalyst in catalyst cooler 7 is eventually removed from the system in the form of steam eliminated from steam disengaging drum 16. Makeup water is supplied to the system as required to compensate for loss resulting from steam production.

The operation of the catalyst cooler should be obvious from the above description. As the temperature within the catalyst bed in reactor 3 tends to rise, controller 9 opens valve 8 wider and allows more catalyst to flow downward through standpipe 6 which results in more catalyst passing upward through the tubes 11 of the catalyst cooler 7. This catalyst gives up heat to the water surrounding the cooling tubes 11, said heat finally being removed as previously described. On the other hand, if the temperature within the catalyst bed in reactor 3 tends to fall the opposite occurs. Valve 8 tends to close and thus allows less catalyst to circulate through cooler 7 thus removing less heat from the catalyst bed. In this manner temperature is kept constant in reactor 3.

Another portion of the fluidized catalyst in reactor 3 passes downward through standpipe 18 in catalyst reactivator 19. Hydrogen from any convenient source is introduced via line 20 into the bottom of catalyst reactivator 19 through ring distributor or spider 21. This hydrogen lifts the catalyst from the bottom of the catalyst reactivator 19 through tubes 22 therein and discharges it into reactor 3. Tubes 22 may be surrounded with water as described in conjunction with catalyst cooler 7. While water surrounds the tubes of catalyst cooler 7 for the purpose of removing the heat of reaction, this is not necessary with respect to catalyst reactivator 19. While the treatment of catalyst with hydrogen is an exothermic reaction (for reasons not understood) the amount of reaction occurring in reactivator 19 is so small that under all except the most unusual circumstances ordinary radiation more than serves to dissipate the heat evolved. Accordingly, with respect to the reactivator, the tubes thereof are surrounded by water, not to remove heat, but rather to maintain the catalyst at such a temperature level that the reactivation process occurs at a sufficiently high rate. Other means can be used to maintain this temperature level, e. g. efficient insulation. Obviously, the rate of circulation of catalyst through catalyst reactivator 19 depends largely upon the rate of introduction of hydrogen through line 20.

The catalyst is continuously reactivated by the hydrogen treatment applied as above described. Actually, the amount of reactivation necessary to keep the catalyst in a high state of activity is very small. A high state of activity is maintained if the average catalyst particle is in the reactivation leg less than 1% of the time. Apparently, if the average catalyst particle is in the reactivation leg about 0.5 to 0.75% of the time this is sufficient to maintain activity of the catalyst.

It is evident that the objects of my invention are accomplished by the procedure above described. The operating temperature remains constant throughout the entire life cycle of a charge of catalyst. The synthesis gas charge rate remains constant throughout the entire life cycle of a charge of catalyst. Product production in unit time remains constant throughout the entire life cycle of a charge of catalyst. The on-stream period is not interrupted for reactivation throughout the entire life cycle of a charge of catalyst. Finally, the life cycle of a charge of catalyst is greater than under prior art procedures.

Some catalyst particles rise, suspended in the reaction products, into settling zone 23 above catalyst level 5 in reactor 3. Some of these suspended particles fall back on the surface of catalyst bed 5 and most or all of the remaining particles are removed from the gaseous product stream by various means known to those skilled in the art, for example, cyclone separators, Cottrell precipitators, filters and the like, either singly or in combination. An internal cyclone separator 24 is shown in Figure 1. The gaseous reaction products, carrying suspended catalyst particles enter cyclone 24 through tangential inlet 25. Separated catalyst is returned to the catalyst bed through dip leg 26 while gaseous reaction products, free or practically free from suspended catalyst particles, leave by duct 27.

As mentioned previously, other means or additional means may be employed to separate suspended catalyst particles from the gaseous reaction products, for example, filters. Such filters may, for example, consist of porous earthenware forms of controlled pore size. The suspension, on passing through the pores, is stripped of the catalyst particles which collect as a layer on the up stream side of the filter, said layer being removed by any suitable method, for example, by periodically blowing a gas stream back through the filter in the direction opposite to that taken by the suspension of catalyst particles in the reaction products. Obviously, for continuous operations, at least two such filtering units are necessary so that the suspension of catalyst particles in the reaction products is passing through at least one filtering unit at all times. For example, four filtering units may be provided and at any one time three units are filtering and one is being blown back, the two operations being maintained in sequence by the opening and closing of valves in the proper order, preferably automatically through a time cycle controller.

Also, the filters may take the form of filter bags. These may be made from asbestos cloth or glass cloth. Actually, because of the rather low temperatures that prevail, filter bags made from animal or vegetable fibers, especially wool, are quite satisfactory. The catalyst layer may be removed from the surfaces of such filters by subjecting them to intermittent or continuous vibration or shaking. Obviously, with such filters, filtering and removal of the collected catalyst layer may occur simultaneously. Accordingly, but one filter unit is necessary.

In this reaction, and in exothermic reactions in general, care must be taken that conditions do not get out of hand in the layer of catalyst collecting on the up-stream surface of the filter. Frequently, the reaction has not proceeded to ultimate completion by the time the filters are reached. For example, the Fischer synthesis is frequently conducted in two stages with product separation after each stage. Obviously, under such circumstances, the reaction products from the first stage are still capable of further reaction since these, after removal of the higher hydrocarbons produced, are actually passed to the second stage for further reaction. When the reaction products from the first stage pass through the layer of catalyst on the up-stream side of the filter further reaction may here occur with its accompanying temperature rise. This may easily result in the conversion of the previously unreacted synthesis gas to methane, the permanent destruction of the activity of the layer of catalyst on the filter and the decomposition of the hydrocarbons previously formed. Obviously, these disadvantageous manifestations may be avoided by cooling the layer of catalyst on the filters. However, with earthenware or fiber filters, the problem of cooling is a difficult one. I have found that cooling is easily accomplished by using porous metal filters with embedded cooling coils. Such porous metal filters are preferably manufactured by employing the techniques of powder metallurgy. Before compressing and sintering the powdered metal to form porous metal blocks of controlled pore size, a coil of adequate size, preferably of the same metal or alloy as the powder, is placed in the mold. The porous metal block of controlled pore size that results contains an embedded and, to all intents and purposes, an integral cooling coil whereby it is possible to keep the porous metal block of controlled pore size at any desired temperature when being used as a catalyst filter.

Turning now to a more detailed consideration of Figure 2, it will be noted that the reactor is similar to that illustrated in Figure 1 with the exception that in Figure 2 the catalyst reactivator 19 is suspended from catalyst cooler 7 rather than the two being mounted side by side as illustrated in Figure 1.

In Figure 2, fluidized catalyst flows downward through standpipe 6. A portion of this descending stream of catalyst is withdrawn through a side port 28 leading from standpipe 6, the rate of withdrawal being controlled by the setting of valve 8. The setting of valve 8 may be regulated by the means and method and for the reasons described in connection with Figure 1. The remainder of the catalyst flowing downward through standpipe 6 passes to the bottom of catalyst reactivator 19 and is moved upwards through tubes 22 therein by means of hydrogen introduced through line 20 and distributor 21. When the catalyst moves to the top of catalyst reactivator 19 it is in turn picked up by synthesis gas introduced through valve 12 and distributor 13 and is moved upward, in admixture with catalyst discharged through side port 28, through tubes 11 in catalyst cooler 7 back to reactor 3.

Turning now to a more detailed consideration of Figure 3, it will be noted that this modification of the reactor is the simplest yet considered. This modification is particularly useful when the synthesis gas is made by the water gas reaction in accordance with equations previously given. By the orthodox water gas reaction a synthesis gas containing carbon monoxide and hydrogen in a 1:1 ratio is produced. As previously mentioned, a portion of this gas is reacted with additional water (steam) to produce carbon dioxide and hydrogen. On mixing the two gas streams (after removal of carbon dioxide if desired) a mixture is obtained, in accordance with equations previously given, containing carbon monoxide and hydrogen in the desired 1:2 ratio. However, if the two gas streams are not mixed, there is available two volumes of gas containing hydrogen and carbon monoxide in a 1:1 ratio and one volume of hydrogen in admixture or not, as desired, with one half volume of carbon dioxide. Under most circumstances this amount of hydrogen (plus, if desired, carbon dioxide) is sufficient to move the requisite amount of catalyst through a catalyst cooler to maintain the desired temperature in the reactor. Simultaneously, the hydrogen reactivates the catalyst in the cooler and then this hydrogen mixes with the hydrogen deficient synthesis gas in the reactor to give a synthesis gas of the desired hydrogen-carbon monoxide ratio.

Synthesis gas of 1:1 ratio passes through line 1 and valve 2, entering reactor 3 through distributor 4. Fluidized catalyst descends through standpipe 6 in combined catalyst cooler and reactivator 7, the rate of catalyst descent being regulated by valve 8 which may be controlled by the means and method and for the purposes previously described.

Sufficient hydrogen (in admixture, if desired, with carbon dioxide) enters the system through line 20 to bring the 1:1 synthesis gas entering through line 1 to a 1:2 ratio. Part at least of this hydrogen passes through valve 29 and distributor 21 into the bottom of combined catalyst cooler and reactivator 7 whereby it serves to move the catalyst upward through tubes 11 thereby simultaneously cooling and reactivating the catalyst. A small amount of hydrogen, in admixture, if desired with carbon dioxide may be introduced directly into standpipe 6 for purposes previously set forth. Any hydrogen, in admixture, if desired, with carbon dioxide over requirements for moving and aerating catalyst may pass through valve 30 to distributor 4 in reactor 3. Obviously, immediately on reaching reactor 3, the hydrogen deficient synthesis gas entering through line 1 mixes with hydrogen introduced through valves 29 and 30 and into standpipe 6 to form a synthesis gas mixture of the desired 1:2 ratio.

Pure or substantially pure hydrogen is slightly more effective in reactivating synthesis catalyst than the 1:2 carbon dioxide-hydrogen mixture resulting from the interaction of orthodox water gas and steam. Accordingly, some small advantage results from removing the carbon dioxide from the mixture prior to introducing into distributor 21. The same applies to gas introduced through valve 30 into distributor 4 since any carbon dioxide introduced through distributor 4 (or distributor 21 or standpipe 6) acts as an inert diluent in the reactor. Accordingly, if convenient, it is somewhat advantageous to remove most or all of the carbon dioxide from the gas introduced through distributor 21 and/or valve 30 and distributor 4 and/or standpipe 6.

It is evident that Figures 2 and 3 actually represent a single elongated bed of fluidized synthesis catalyst divided into two zones, an upper reaction zone located above an intermediate point at which the carbon monoxide-hydrogen mixture is introduced and a lower reactivating zone extending from the point at which the hydrogen is introduced at the lower point of the bed up to the intermediate point at which the carbon monoxide-hydrogen mixture is introduced. In Figure 2, the reaction zone is in turn divided into two portions, a lower cooling (and reaction zone) and an upper reaction zone proper. In Figure 3, the reactivating zone actually combines the functions of a reactivating zone and a cooling zone.

In Figure 1, the reaction zone is divided into two portions, a lower cooling (and reaction) zone and an upper reaction zone proper. Figure 1, in addition, has an appended reactivating zone attached approximately at the junction of the lower cooling (and reaction) zone and the upper reaction zone proper.

The reaction products leaving reactor 3 by duct 27 may be worked up in accordance with prior art practices or by any other suitable methods. Usually the Fischer synthesis is conducted in two stages with the separation of the higher hydrocarbon reaction products after each. Usually, about 65 to 70% of the theoretical reaction is allowed to proceed in the first stage and, of course, all of the remainder possible (usually about 20 to 25% of the theoretical) in the second stage.

In accordance with prior art, higher hydrocarbons are usually separated from unreacted synthesis gas by condensation and/or adsorption and/or absorption. The total reaction products are cooled whereby a considerable amount of the higher boiling products separate. The cooling may be accomplished by indirect heat exchange or directly, for example, by direct contact of the hot gaseous reaction products with a water spray. The liquid hydrocarbons separating are recovered and the residual gas may be stripped of the lower boiling hydrocarbons by adsorption through use of a solid adsorbing agent such as activated charcoal or by absorption using a liquid absorption oil. From the recovery system following the first reaction stage the residual stripped gases pass to the second stage; from the recovery system following the second stage the residual stripped gases are wasted or used as fuel. As mentioned, other suitable methods of liquid recovery may be employed.

The recovered higher hydrocarbons may be worked up as desired. For example, they may be fractionated into light naphtha, heavy naphtha and higher boiling residue. This last may be cracked, preferably in the presence of catalysts of which synthetic, hydrated crystalline magnesium silicates are especially suitable, while the heavy naphtha may be catalytically aromatized.

While the objects of my invention are best achieved through use of an apparatus employing a fluidized bed of catalyst, the invention is by no means restricted thereto. For example, the objects of my invention may be achieved through use of an apparatus employing a moving bed of catalyst. Such an apparatus is illustrated, for example, in Figures IV and V of my copending application, Serial Number 277,885, filed June 7, 1939, now U. S. Patent 2,372,018 issued March 20, 1945. The synthesis reaction proper proceeds in the reactor through which the synthesis catalyst is moving. (In this particular embodiment the synthesis catalyst is preferably in the form of granules of appreciable size rather than being finely divided as in fluidized catalyst operations.) Catalyst removed from the reactor is transferred to the regenerator. During movement through the regenerator the catalyst is contacted with hydrogen to bring about reactivation. The reactivated catalyst is returned to the reactor to be again moved therethrough. Since the reactor of Serial Number 277,885 is employed in an endothermic reaction no cooling means are necessary and hence not shown. Obviously, if employed in the exothermic Fischer synthesis the reactor must be provided with adequate cooling means.

While the foregoing description features continuous hydrogen reactivation of the synthesis catalyst, it is obvious that continuous reactivation is not necessary. To maintain a high state of catalyst activity the catalyst need only be contacted with hydrogen over a small percentage of the total time on-stream as has been previously noted. This reactivation need not be done continuously but can be done intermittently at more or less frequent intervals if desired. However, all points considered, continuous reactivation is most convenient and is preferred.

In further exposition of my invention, the following illustrative, specific, non-limiting example thereof is given:

Nine hundred and sixty-seven volumes of gas containing 14.3% carbon dioxide, 28.3% carbon monoxide, 54.2% hydrogen, 0.4% methane and 2.8% nitrogen were passed in unit time to a reactor similar to that shown in Figure 1. A portion of the gas was introduced directly into the reactor while the remainder was fed to the bottom of the catalyst cooler, the relative proportions of the two gas streams being fixed in accordance with the principles previously explained. Obviously, the relative proportions may be varied over wide limits. If the temperature of the water surrounding the tubes of the catalyst cooler is low, a relatively slow circulation of catalyst will maintain temperature constant in the reactor while if the water temperature is high, rapid circulation of catalyst is necessary. As is evident, the relative proportion of the gas introduced into the bottom of the catalyst cooler is a function of the amount of catalyst that must be circulated to maintain temperature constant in the reactor. Hydrogen from a source hereinafter described was added to the reactivating leg of the reactor at a rate of 21 volumes in unit time. The reaction products were cooled by a direct water spray and the heavier higher hydrocarbons separated. The resulting cooled gas stream was then subjected to conventional absorption-stripping, a suitable fraction of the hydrocarbons produced being used as absorption oil. For every cubic meter of gas charged (the synthesis gas of the analysis shown plus the reactivating hydrogen) there were obtained 81.6 g. of higher hydrocarbons by the above described cooling and absorption procedures.

The cooled and stripped gas from the first stage amounted to 417 volumes in unit time. The composition of this gas was 32.7% carbon dioxide, 20.2% carbon monoxide, 32.6% hydrogen, 8.3% methane and 6.2% nitrogen. Calculation shows that the gas contraction in the first stage was 57% while 69% of the carbon monoxide charged to the first stage reacted. The cooled and stripped gas was passed to the second stage reactor which was similar to the first stage reactor only considerably smaller. These 417 volumes were passed through the second stage reactor in unit time while 7 volumes of hydrogen from a source to be described subsequently were passed through the reactivation leg in unit time.

The reaction products from the second stage were worked up by cooling and absorption-stripping as previously described. For every cubic meter of gas charged (the synthesis gas of the analysis shown plus the reactivating hydrogen)

to the first stage there were obtained 27.4 g. of higher hydrocarbon product following the second stage.

The cooled and stripped gas from the second stage amounted to 264 volumes in unit time. Its composition was 49.3% carbon dioxide, 9.9% carbon monoxide, 15.8% hydrogen, 15.4% methane and 9.6% nitrogen. Calculation shows that the gas contraction in the second stage was 37% and that 69% of the carbon monoxide charged to the second stage reacted. This last figure is equivalent to about 21% of the carbon monoxide charged to the first stage.

Calculated over both reaction stages, the gas contraction was about 74%. Of the carbon monoxide charged, some 91% reacted. For each cubic meter of the synthesis gas of the analysis shown, 109 g. of higher hydrocarbons were obtained, equivalent to somewhat more than 130 g. per cubic meter of the theoretical 1:2 synthesis gas mixture.

The total recovered liquid was fractionated to produce 32% of light naphtha of 70 octane number, 34.5% heavy naphtha and 33.5% bottoms. The heavy naphtha boiled in the range 200° to 400° F. The heavy naphtha was brought to a pressure of 300 pounds per square inch and heated to a temperature of 950° F. Hydrogen at a temperature of about 1250° F. and the aforementioned pressure was added to the heated heavy naphtha charge at a rate of 5 moles per mole of heavy naphtha and the mixture was passed over a catalyst consisting of 6% molybdenum oxide on activated alumina. By this operation a large proportion of the heavy naphtha charge was converted to aromatics with the simultaneous production of large volumes of hydrogen. The reaction products were cooled and separated. The recovered liquid hydrocarbons exhibited an octane rating of 80. The gases were subjected to a conventional absorption-stripping operation so as to concentrate the hydrogen. The recovered hydrogen was divided into three portions. One portion, after necessary recompression, was recycled to the heater prior to mixing with the heavy naphtha charge as previously described. The remaining hydrogen, representing the net hydrogen make from the heavy naphtha catalytic aromatization reaction, was divided into two portions, the ratios and amounts being as already given, and were passed respectively to the first and second synthesis stages for the purpose hitherto set forth.

Be it remembered that while this invention has been described in connection with specific details thereof, these are illustrative only and are not limiting except in so far as said specific details may be incorporated in the appended claims.

I claim:

1. In conducting the Fischer synthesis, the steps including dividing water gas containing carbon monoxide and hydrogen in the approximate ratio 1:1 by volume into two parts in the approximate proportions 2:1 by volume, introducing the larger of said parts into a fluidized bed of synthesis catalyst at an intermediate point of said fluidized bed, admixing the smaller of said parts with approximately 0.5 volume of steam, subjecting the resulting mixture to reaction conditions effective for the conversion into a product consisting essentially of hydrogen and carbon dioxide, processing said product to remove substantially all the carbon dioxide therefrom and introducing the residual hydrogen into the fluidized bed of synthesis catalyst at a low point thereof, the greater part of said hydrogen passing upward to the intermediate point of said fluidized bed to admix with and react with the carbon monoxide component of the synthesis gas introduced at said intermediate point.

2. In conducting the Fischer synthesis, the steps including dividing water gas containing carbon monoxide and hydrogen in the approximate ratio 1:1 by volume into two parts in the approximate proportion 2:1 by volume, introducing the larger of said parts into a fluidized bed of synthesis catalyst at an intermediate point of said fluidized bed, admixing the smaller of said parts with approximately 0.5 volume of steam, subjecting the resulting mixture to reaction conditions effective for the conversion into a product consisting essentially of hydrogen and carbon dioxide, processing said product to remove substantially all of the carbon dioxide therefrom, dividing the residual hydrogen into two parts, introducing one of said parts into the fluidized bed of synthesis catalyst at an intermediate point thereof and introducing the other of said parts into the fluidized bed of synthesis catalyst at a low point thereof, the greater part of this hydrogen passing upward to the intermediate point of said fluidized bed to admix with and react with the carbon monoxide component of the gases introduced at said intermediate point.

3. In conducting the Fischer synthesis, the steps including dividing water gas containing carbon monoxide and hydrogen in the approximate ratio 1:1 by volume into two parts in the approximate proportion 2:1 by volume, introducing the larger of said parts into a fluidized bed of synthesis catalyst at an intermediate point of said fluidized bed, admixing the smaller of said parts with approximately 0.5 volume of steam, subjecting the resulting mixture to reaction conditions effective for the conversion into a product consisting essentially of hydrogen and carbon dioxide, dividing said product into two portions, introducing one of said portions into the fluidized bed of synthesis catalyst at an intermediate point thereof, processing the other portion of said product to remove substantially all the carbon dioxide therefrom and introducing the residual hydrogen into the fluidized bed of synthesis catalyst at a low point thereof, the greater part of this hydrogen passing upward to the intermediate point of said fluidized bed to admix with and react with the carbon monoxide component of the gases introduced at said intermediate point.

ROBERT F. RUTHRUFF.

REFERENCES CITED

The following references are of record in the file of this patent:

UNITED STATES PATENTS

| Number | Name | Date |
|---|---|---|
| 1,799,858 | Miller | Apr. 7, 1931 |
| 2,238,726 | Feisst | Apr. 15, 1941 |
| 2,251,554 | Sable | Aug. 5, 1941 |
| 2,318,626 | Pier | May 11, 1943 |
| 2,347,682 | Gunness | May 2, 1944 |
| 2,358,039 | Thomas | Sept. 12, 1944 |
| 2,360,463 | Arveson | Oct. 17, 1944 |
| 2,360,787 | Murphree | Oct. 17, 1944 |
| 2,373,008 | Becker | Apr. 3, 1945 |
| 2,411,592 | Reeves | Nov. 26, 1946 |
| 2,414,276 | Sensel et al. | Jan. 14, 1947 |
| 2,414,883 | Martin | Jan. 28, 1947 |